United States Patent
Rumney

(10) Patent No.: US 7,403,379 B2
(45) Date of Patent: Jul. 22, 2008

(54) MODULAR COMPUTER SYSTEM

(75) Inventor: Gary Simon Rumney, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 276 days.

(21) Appl. No.: 11/195,764

(22) Filed: Aug. 3, 2005

(65) Prior Publication Data

US 2007/0030638 A1 Feb. 8, 2007

(51) Int. Cl.
*H05K 5/00* (2006.01)
*H05K 7/16* (2006.01)

(52) U.S. Cl. .................... 361/685; 361/727; 312/223.2

(58) Field of Classification Search ................ 361/679, 361/683–686, 724–727, 730; 312/332.1, 312/333, 223.1, 223.2
See application file for complete search history.

(56) References Cited

U.S. PATENT DOCUMENTS

| | | | | |
|---|---|---|---|---|
| 5,515,239 | A | * | 5/1996 | Kamerman et al. ......... 361/727 |
| 6,272,573 | B1 | * | 8/2001 | Coale et al. ................. 710/100 |
| 7,099,151 | B2 | * | 8/2006 | Jones et al. ................. 361/686 |
| 2002/0194412 | A1 | | 12/2002 | Bottom |
| 2003/0075796 | A1 | * | 4/2003 | Hata et al. .................. 257/734 |

\* cited by examiner

*Primary Examiner*—Jayprakash N Gandhi
*Assistant Examiner*—Zachary M Pape
(74) *Attorney, Agent, or Firm*—Rabin & Berdo, P.C.

(57) ABSTRACT

A modular computer system includes a power supply drawer for supplying and regulating the power, an interface module, a plurality of functional drawers, and a case. The interface module is electrically connected to the power supply drawer and the functional drawers, and has an electric power distributor for distributing the power from the power supply drawer. Each of the functional drawers provides a specific function, and has a voltage regulation module for regulating the power from the interface module. The case has one side anchored with the interface module, and includes a plurality of first partitions and a second partition for accommodating the functional drawers and the power supply drawer therein respectively. Thus, the heat produced in operation is not concentrating near the central processing unit in case anymore. By adjusting the specific functions of the functional drawers, users can be fully satisfied with the flexibility of arranging apparatus units.

14 Claims, 10 Drawing Sheets

MODULAR COMPUTER SYSTEM

BACKGROUND OF THE INVENTION

1. Field of Invention

The invention relates to a computer system, and more particularly to a computer system having a modular architecture.

2. Related Art

There is a growing demand for computer systems. The shape-types of computer system cases are numerous and varied to meet the different apparatus demands of each user. But for manufacturers to manufacture different case types costs a great deal of money. For the customers, to pick one case type that meets his or her time demand is not easy. Besides, substituting the components inside the case to meet future demands without throwing the case away is not very convenient. Computer system architectures are illustrated below.

As shown in FIG. 1, the peripheral components 103 are moveably installed inside the drawer frame 1011. The drawer 101 is moveably installed inside the case 102. Through this architecture, the user can substitute the components 103 inside the drawer 101, and the number of manufactured case shapes is reduced. However, the shape of the drawer frame 1011 of the drawer 101 and the types of the peripheral components 103 installed inside the drawer frame 1011 are fixed, and thus the flexibility is highly restricted.

As shown in FIG. 2, the drawer 201 provides more functions than the drawer 101 in FIG. 1. The peripheral components 203a and 203b, such as a hard disk drive, a power supply unit, etc., and a mainboard 204 are moveably installed inside the drawer 201. Also, the drawer 201 is moveably installed inside the case 202. Therefore, not only the peripheral components 203a and 203b but also the mainboard 204 are installed inside the drawer 201. Even though each drawer 201 has many components, users may not require all the functions that the components provide. Thus, the apparatus demands of each user cannot be satisfied fully.

In order to meet the apparatus demands of each user, U.S. Patent application number 20020194412 discloses the following architecture. The server blade 500 is moveably installed inside the modular server system 100. The server blade 500 has a keyboard/mouse connector 501, a serial port 502, a push-button reset/abort button 503, status LEDs 504, a video output plug 505, dual ethernet interfaces 506 and 507, a universal serial bus (USB) 508, and a semiconductor memory 510. A media blade 150 is electrically connected to the server blade 500 to provide media functions. The mainboard 204 can be separated from?? the media blade 150 and the server blade 500, but the server blade 500, which provides many functions, still has too many necessary components therein. Thus the apparatus demands of each user still cannot be satisfied fully.

As shown in FIG.3, another modular sever system used for a long time can be inserted at least a printed circuit board installed on peripheral component interconnects 301, input/output connectors 302, memories 303, central processing units 304, voltage regulation modules 305, magneto-optical disk drives 306, small computer standard interfaces 307, SBCDs 308, NBCDs 309, and etc. So, when the user needs more elements than one printed circuit board supplies with, the user has to insert another printed circuit board into the modular server system. And, users have to insert at least a printed circuit board even he or she needs only a few elements on one printed circuit board. Thus, the users have to pay more money and the users' apparatus demands cannot be satisfied fully.

SUMMARY OF THE INVENTION

In view of these problems, the primary object of the invention is to provide a modular computer system that dissipates the heat produced itself in operation in different places and fully satisfies users' apparatus demands.

To achieve the aforesaid object, the modular computer system includes a power supply drawer, an interface module, a plurality of functional drawers, and a case. The power supply drawer has a power supply module for supplying and regulating the power. The interface module is electrically connected to the power supply drawer, and has an electric power distributor for distributing the power from the power supply drawer. Each of the functional drawers is electrically connected to the interface module to provide a specific function, and each of the functional drawers has a voltage regulation module for regulating the power from the interface module. And, the case has one side anchored with the interface module, and comprises a plurality of first partitions for accommodating the functional drawers therein and a second partition for accommodating the power supply drawer therein.

The specific function is one of the group consisting of data processing and data storage functions, a media playing function, a connecting function, or a data storage function, and etc. When the functional drawer has data processing and data storage functions, the single-function module can be a central processing unit module. When the functional drawer has a media playing function, the single-function module can be a removable media module. When the functional drawer has a connecting function, the single-function module can be a peripheral component interconnect interface card module. When the functional drawer has a data storage function, the single-function module can be a hard disk drive module.

So, the power supply drawer supplies the power to the interface module after regulating the power to a voltage value itself. The interface module distributes the power from the power supply drawer to the functional drawer. Then, the functional drawer regulates the power from the interface module by the voltage regulation module.

Thus, the heat produced in operation is dissipated in different places, such as the power supply drawer, the interface module, and the functional drawer, in case and not concentrating in a place near the central processing unit as the prior art. Also, it fully satisfies users' apparatus demands respectively. And, the type of the interface element corresponds to the functional drawer that the users required.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
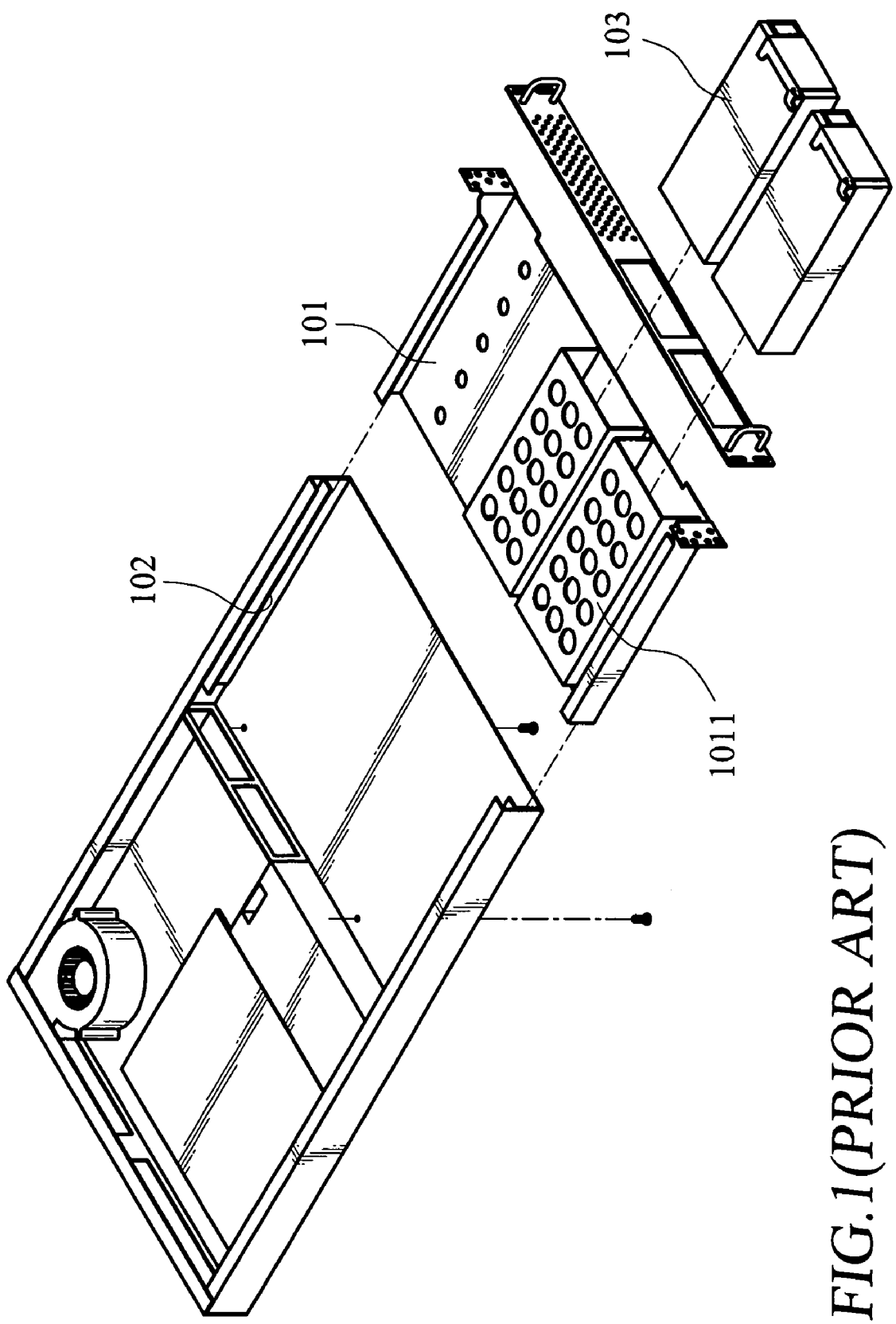
FIG. 1 shows the prior art.
Figure 2:
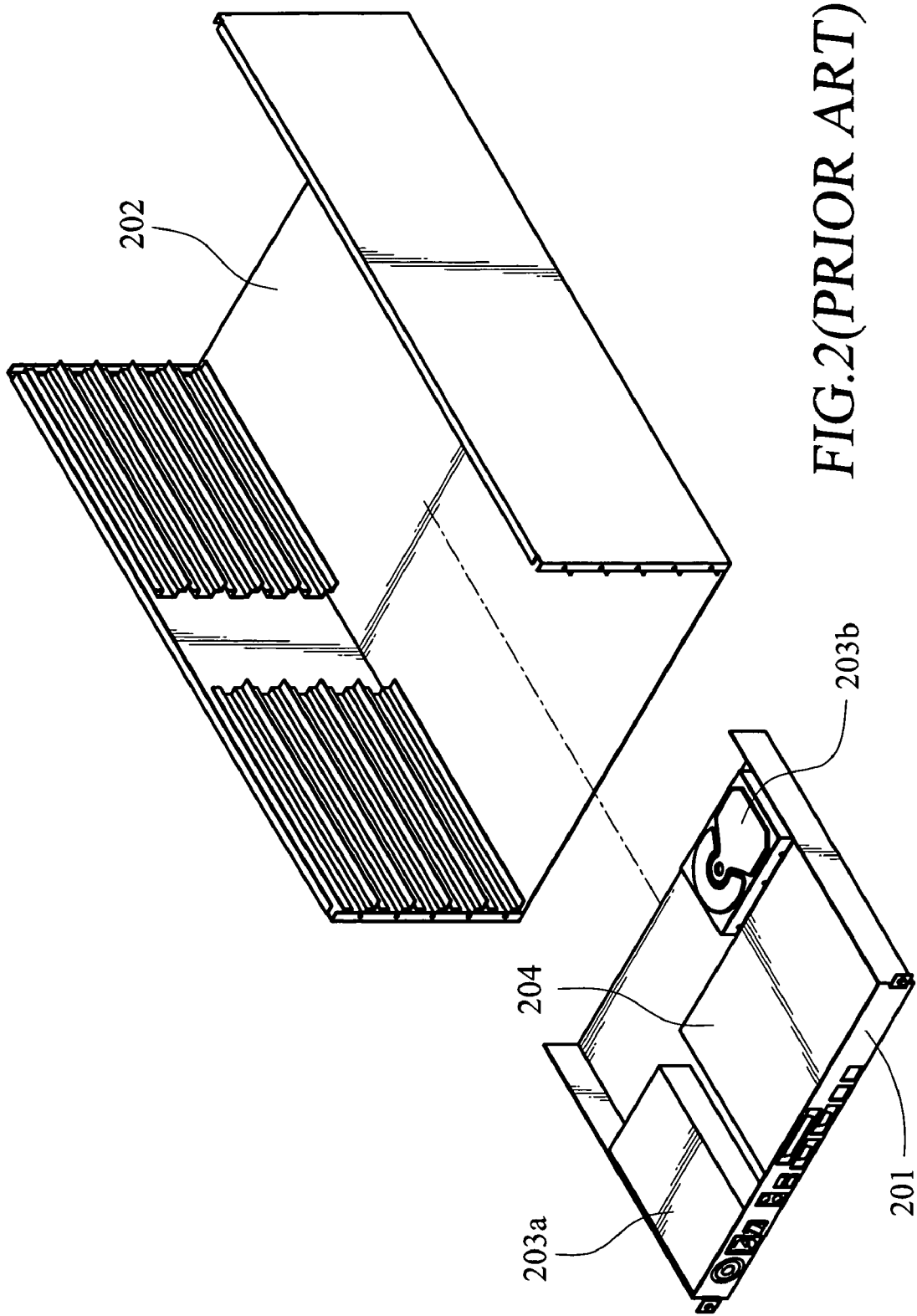
FIG. 2 shows another prior art.
Figure 3:
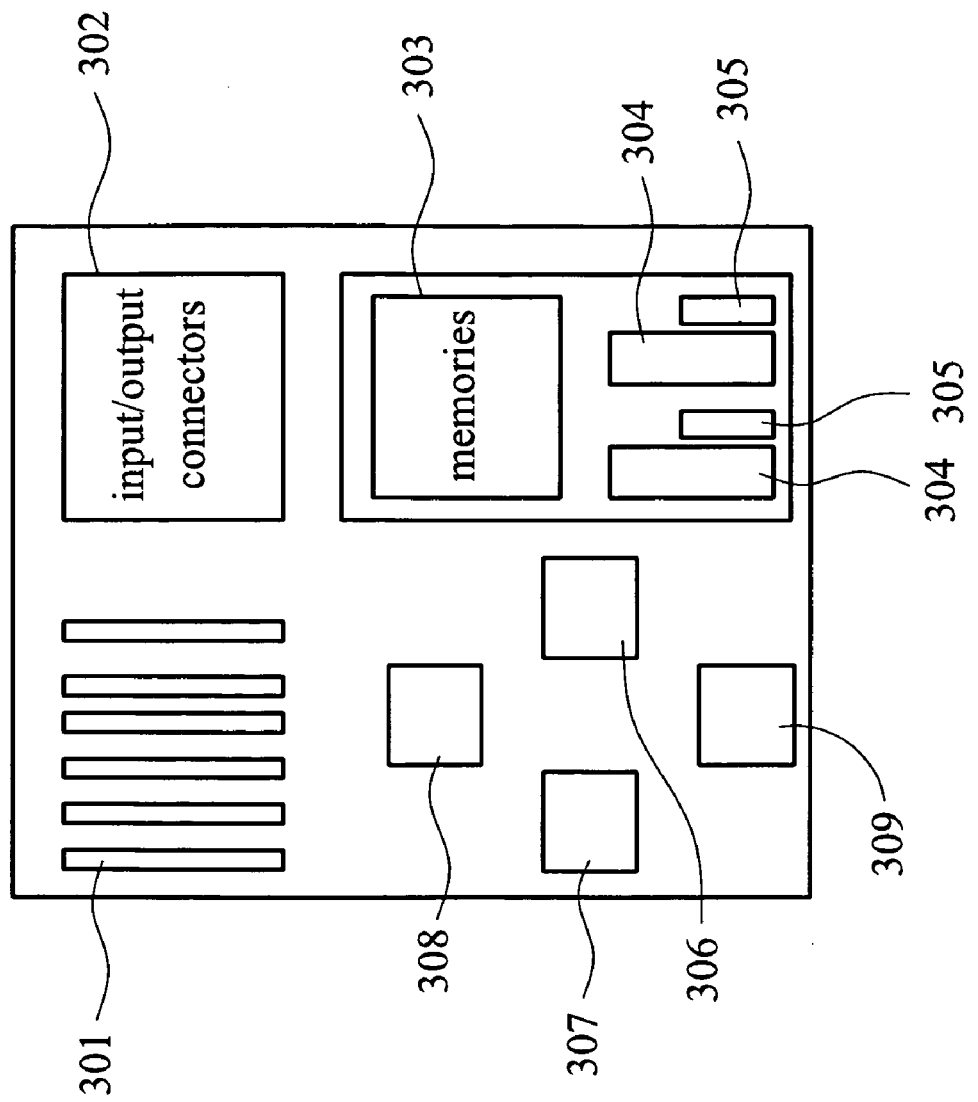
FIG. 3 shows the other prior art.
Figure 4:
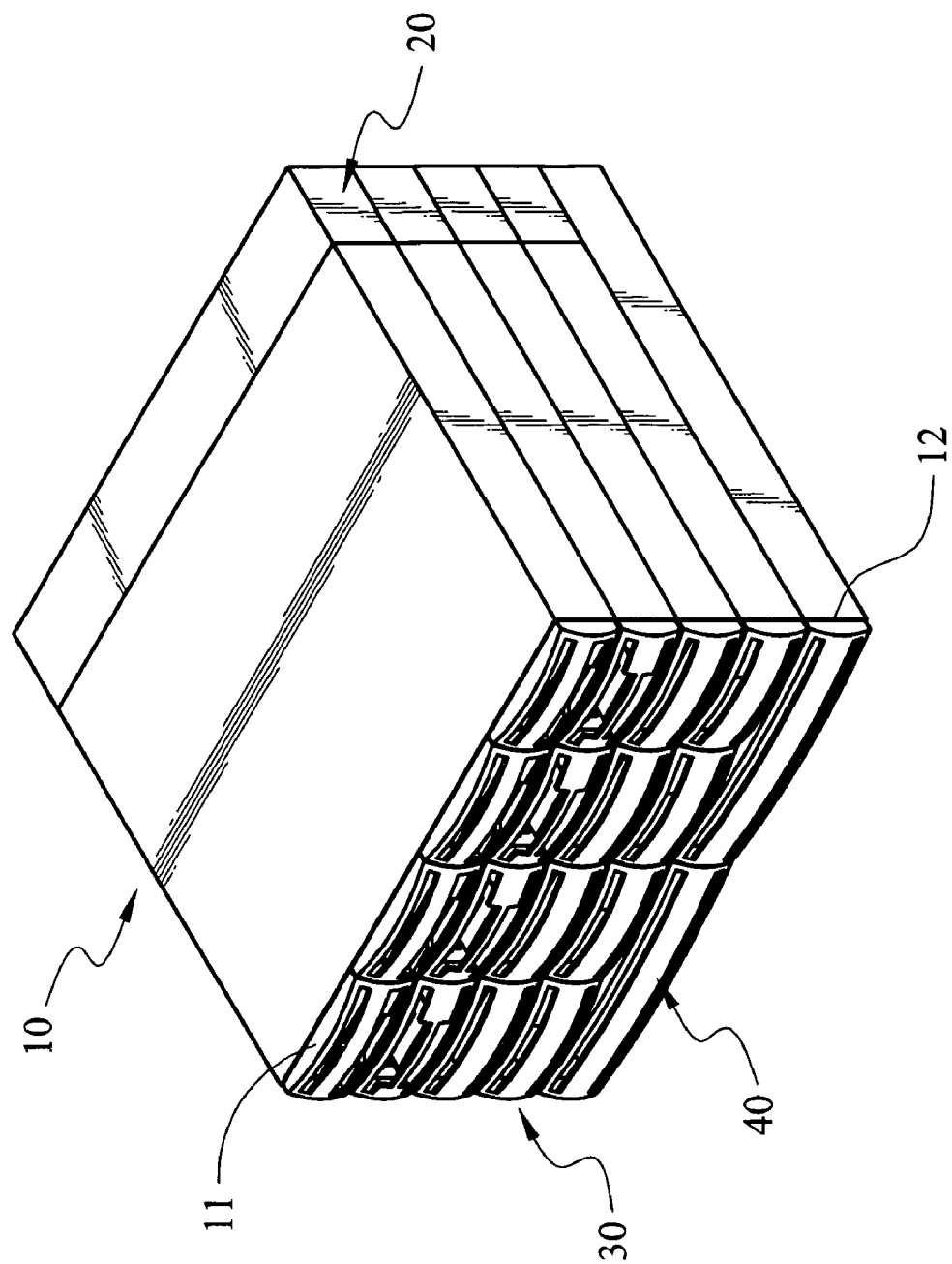
FIG. 4 shows the structure of the invention.

Referring to FIG. 4, the modular computer system according to the invention includes a case 10, a plurality of interface modules 20 (four as shown), a plurality of functional drawers 30 (sixteen as shown), and a plurality of power supply drawer 40 (two as shown).

The case 10 is used for installing the interface modules 20, the functional drawers 30, and the power supply drawers 40. The case 10 has a plurality of first partitions 11 (sixteen as shown) and a plurality of second partitions 12 (two as shown). The first partition 11 accommodates a functional drawer 30. The second partition 12 accommodates a power supply drawer 40.

Figure 5:
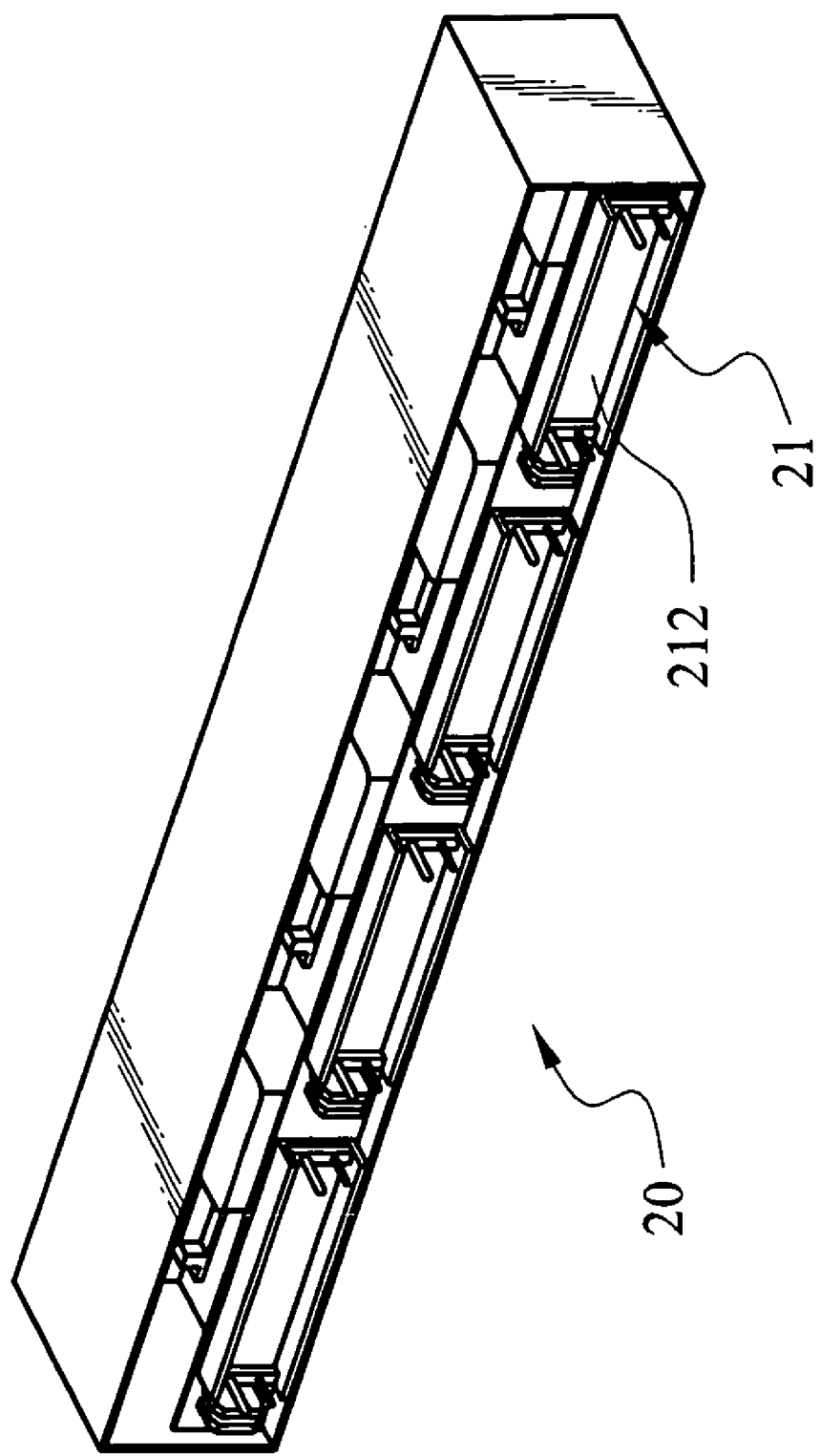
FIG. 5 shows the structure of the interface module.
Figure 6:
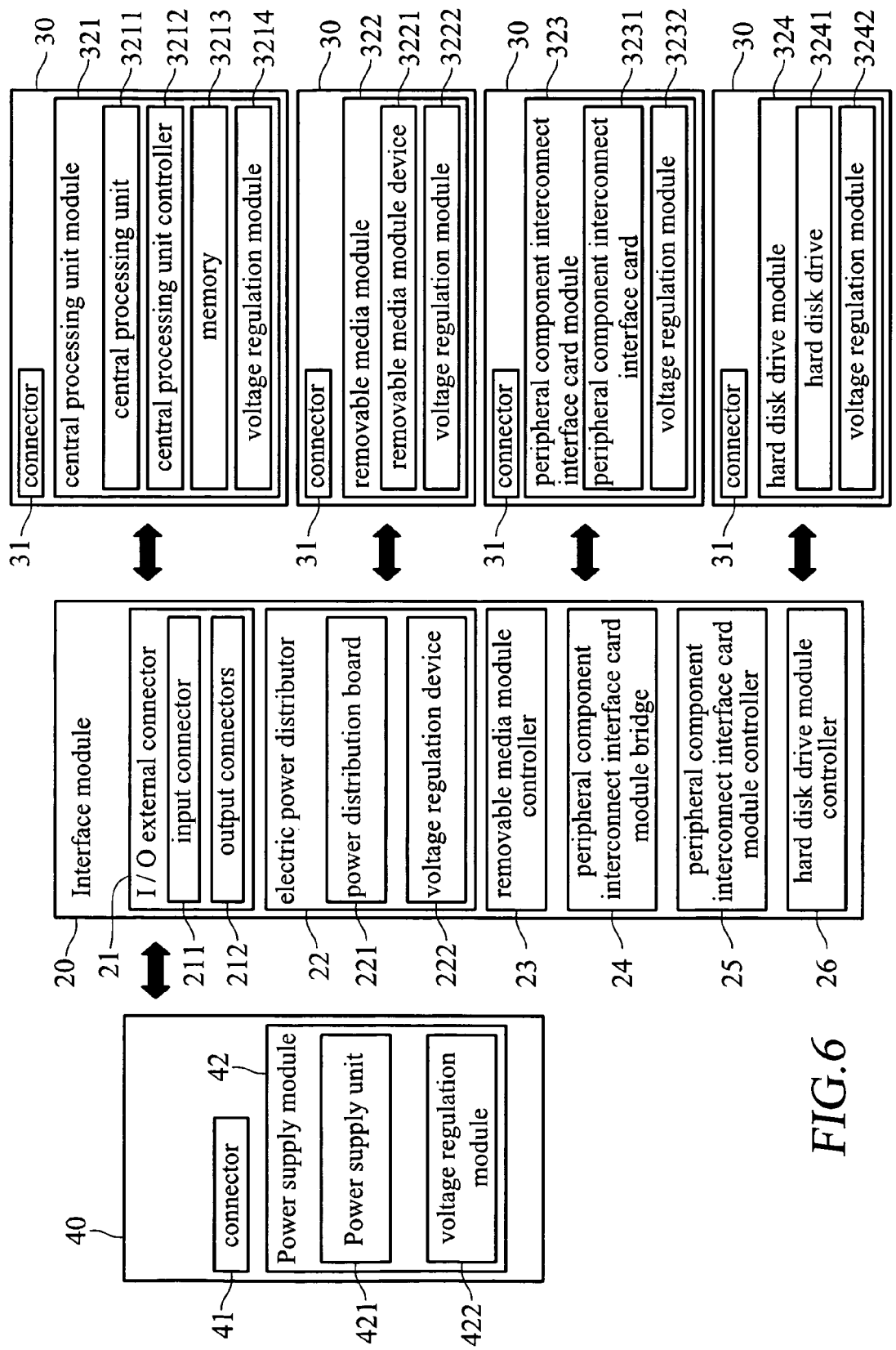
FIG. 6 shows the block diagram of the invention.

Referring to FIGS. 4, 5, and 6, the interface module 20 is anchored on one side of the case 10. The interface module 20 comprises an input/output external connector unit 21, an electric power distributor 22, and at least an interface element choosing from the group consisting of a removable media module controller 23, a peripheral component interconnect interface card module controller 24, a peripheral component interconnect interface card module bridge 25, and a hard disk drive module controller 26.

The input/output external connector unit 21 has an input connector 211 which is electrically connected to the power supply drawer 40, and a plurality of output connectors 212 (four as shown in FIG. 4) which corresponds respectively to the first partition 11 and is electrically connected to the functional drawer 30. The electric power distributor 22 is used for distributing the power from the power supply drawer 40, to the functional drawer 30. The electric power distributor 22 has a power distribution board (PDB) 221, and a voltage regulation device (VRD) 222 which is connected to the power distribution board (PDB) 221.

Referring to FIGS. 4, 5, 6, and 7, the functional drawer 30 is installed inside one of the first partition 11, and the functional drawers 30 comprises a connector 31 which is electrically connected to the output connectors 212, and at least a single-function module. As the connector 31 is electrically connected to the output connectors 212, the electric power distribution 22 distributes the power from the power supply drawer 40 to the functional drawer 30, by the power distribution board (PDB) 221 and the voltage regulation device (VRD) 222. The single-function module has at least a specific function. The specific function is one of the group consisting of data processing and data storage functions, a media playing function, a connecting function, or a data storage function, and etc. And the types of the single-function module are listed hereinafter.

Figure 7:
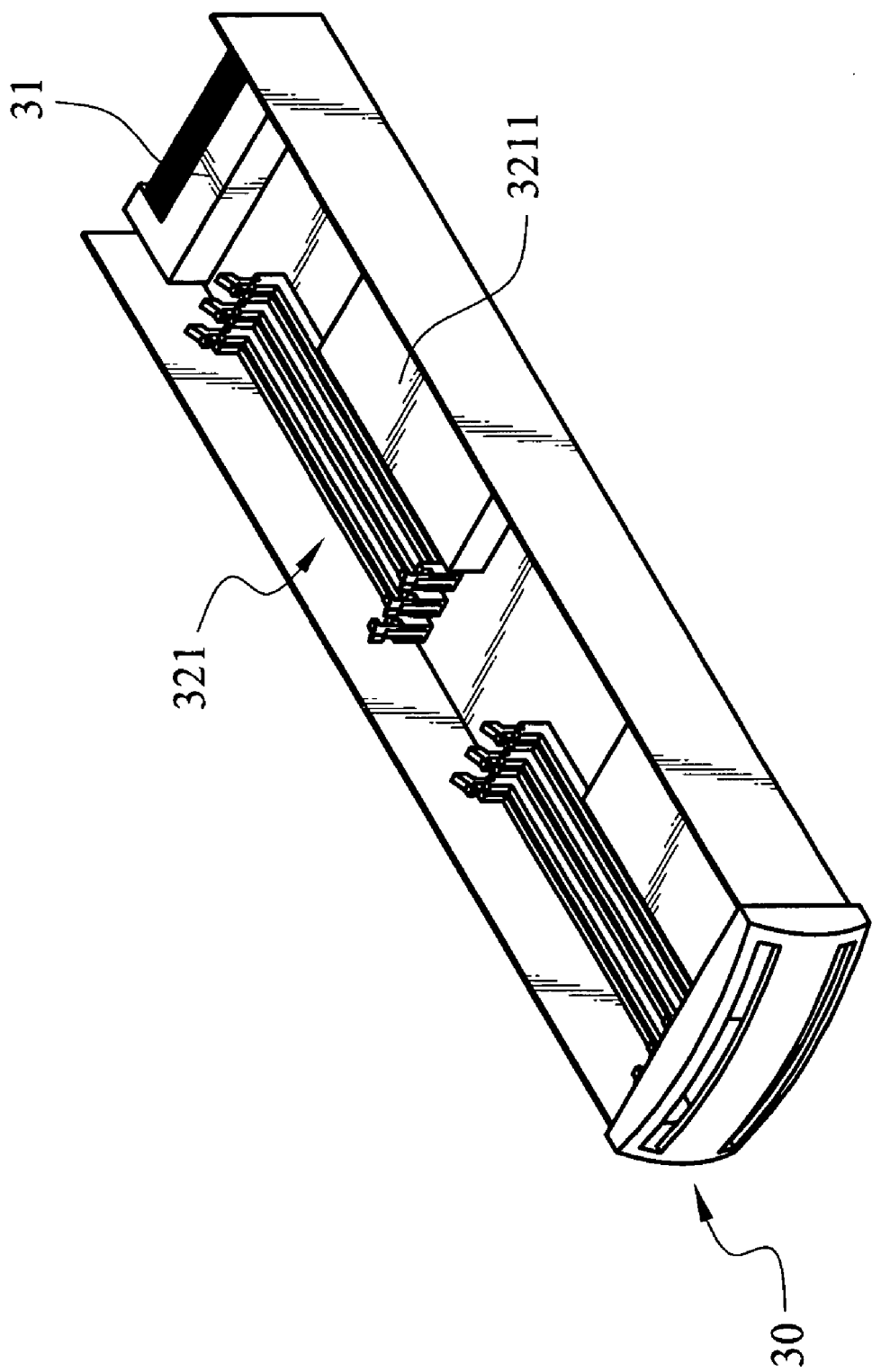
FIG. 7 shows the drawer with the first type of the single-function module.

When the single-function module has data processing and data storage functions, the single-function module can be a central processing unit module 321 as shown in FIGS. 6, and 7. The central processing unit module 321 has a central processing unit (CPU) 3211 (two as shown in FIG. 7), a central processing unit controller 3212, a memory 3213, and a voltage regulation module 3214. The central processing unit 3211 is used for data processing. The central processing unit controller 3212 is used for communicating with the connector 31, the central processing unit (CPU) 3211, the memory 3213, and the voltage regulation module 3214. The memory 3213 is used for data storage. The voltage regulation module 3214 is used for regulating the power from the interface module 20 to the voltage value that the central processing unit 3211 needs. As the connector 31 electrically is connected to the output connectors 212, the electric power distributor 22 detects that the single-function module is a central processing unit module 321. The electric power distributor 22 also distributes the power that the central processing unit module 321 needs, by the power distribution board (PDB) 221 and the voltage regulation device (VRD) 222.

Figure 8:
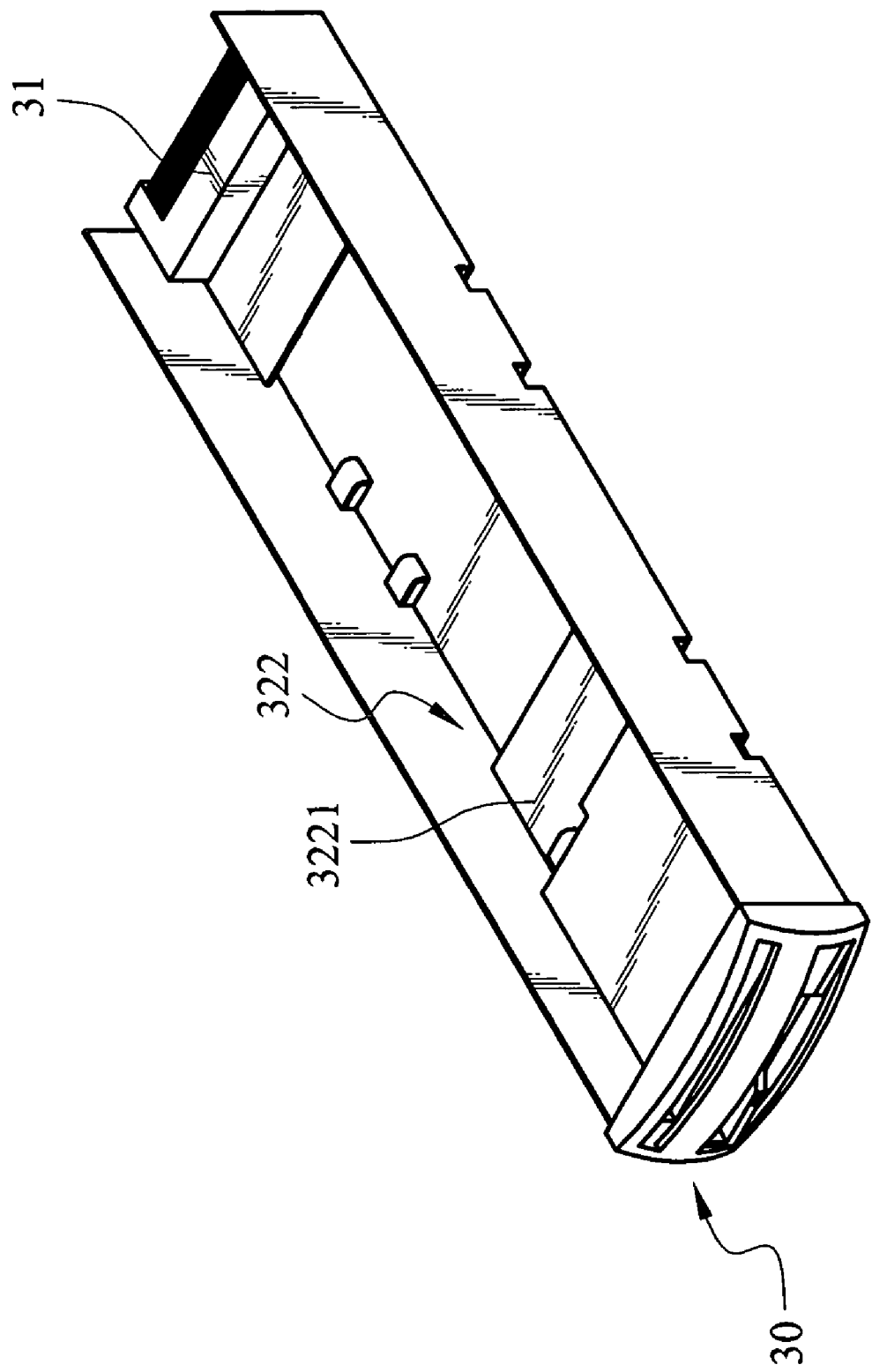
FIG. 8 shows the drawer with the second type of the single-function module.

When the single-function module has a media playing function, the single-function module can be a removable media module 322 as shown in FIGS. 6, and 8. The removable media module 322 has a removable media module device 3221 (one as shown in FIG. 8), and a voltage regulation module 3222. The removable media module device 3221 is used for playing media files. The voltage regulation module 3222 is used for regulating the power from the interface module 20 to the voltage value that the removable media module device 3221 needs. As the connector 31 electrically is connected to the output connectors 212, the electric power distributor 22 detects that the single-function module is a removable media module 322 so that the removable media module controller 23 controls the motion of the removable media module 322. The electric power distributor 22 also distributes the power that the removable media module 322 needs, by the power distribution board (PDB) 221 and the voltage regulation device (VRD) 222.

Figure 9:
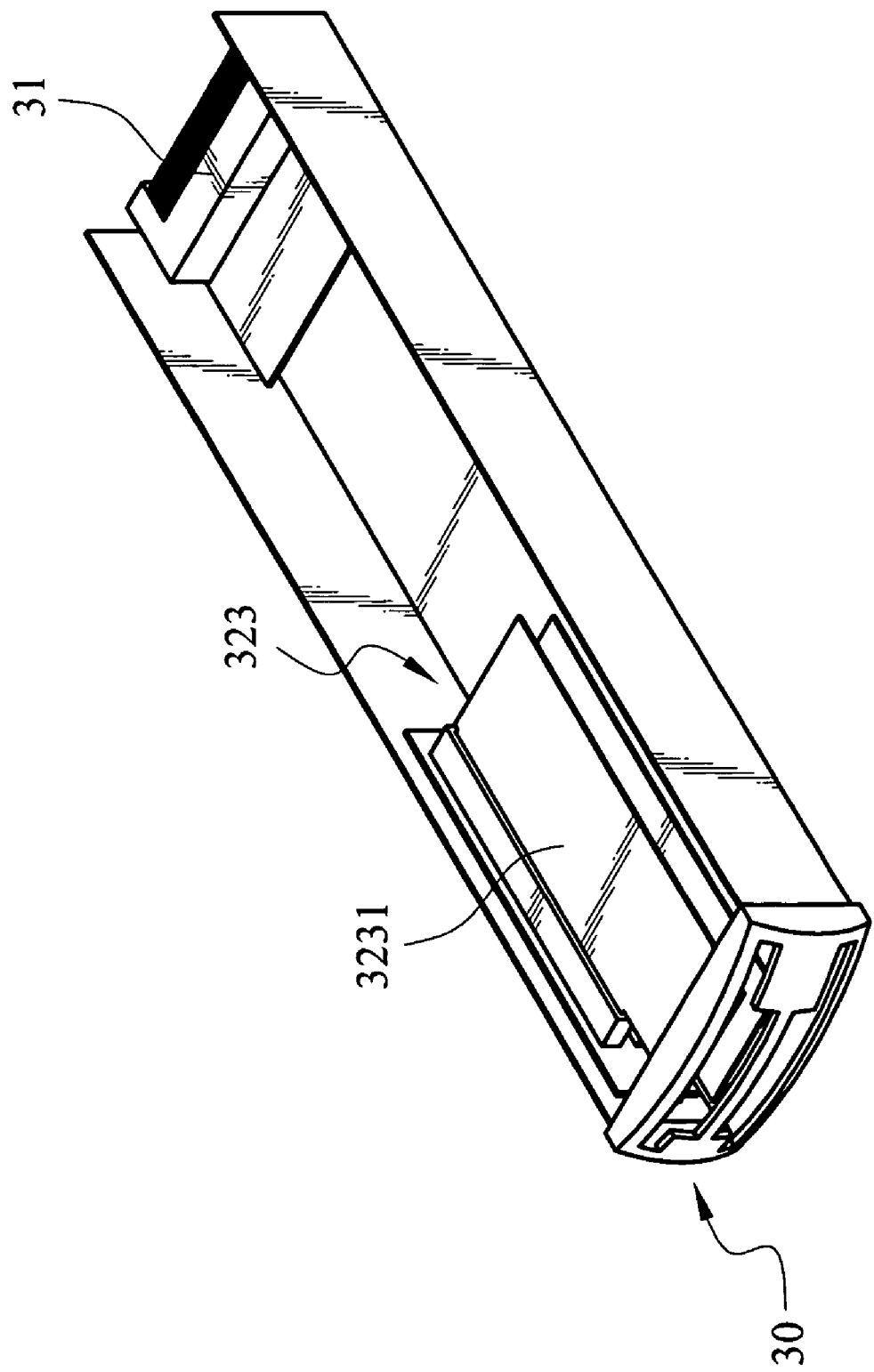
FIG. 9 shows the drawer with the third type of the single-function module.

When the single-function module has a connecting function, the single-function module can be a peripheral component interconnect interface card module 323 as shown in FIGS. 6, and 9. The peripheral component interconnect interface card module 323 has a peripheral component interconnect interface card 3231 (two as shown in FIG. 9), and a voltage regulation module 3232. The peripheral component interconnect interface card 3231 is used for electrically connecting to other components. The voltage regulation module 3232 is used for regulating the power from the interface module 20 to the voltage value that the peripheral component interconnect interface card 3231 needs. As the connector 31 electrically. is connected to the output connectors 212, the electric power distributor 22 detects that the single-function module is a peripheral component interconnect interface card module 323 so that the peripheral component interconnect interface card module bridge 24 connects to the interface module 20 and the functional drawer 30, and so that the peripheral component interconnect interface card module controller 25 controls the motion of the peripheral component interconnect interface card module 323. The electric power distributor 22 also distributes the power that the peripheral component interconnect interface card module 323 needs, by the power distribution board (PDB) 221 and the voltage regulation device (VRD) 222.

Figure 10:
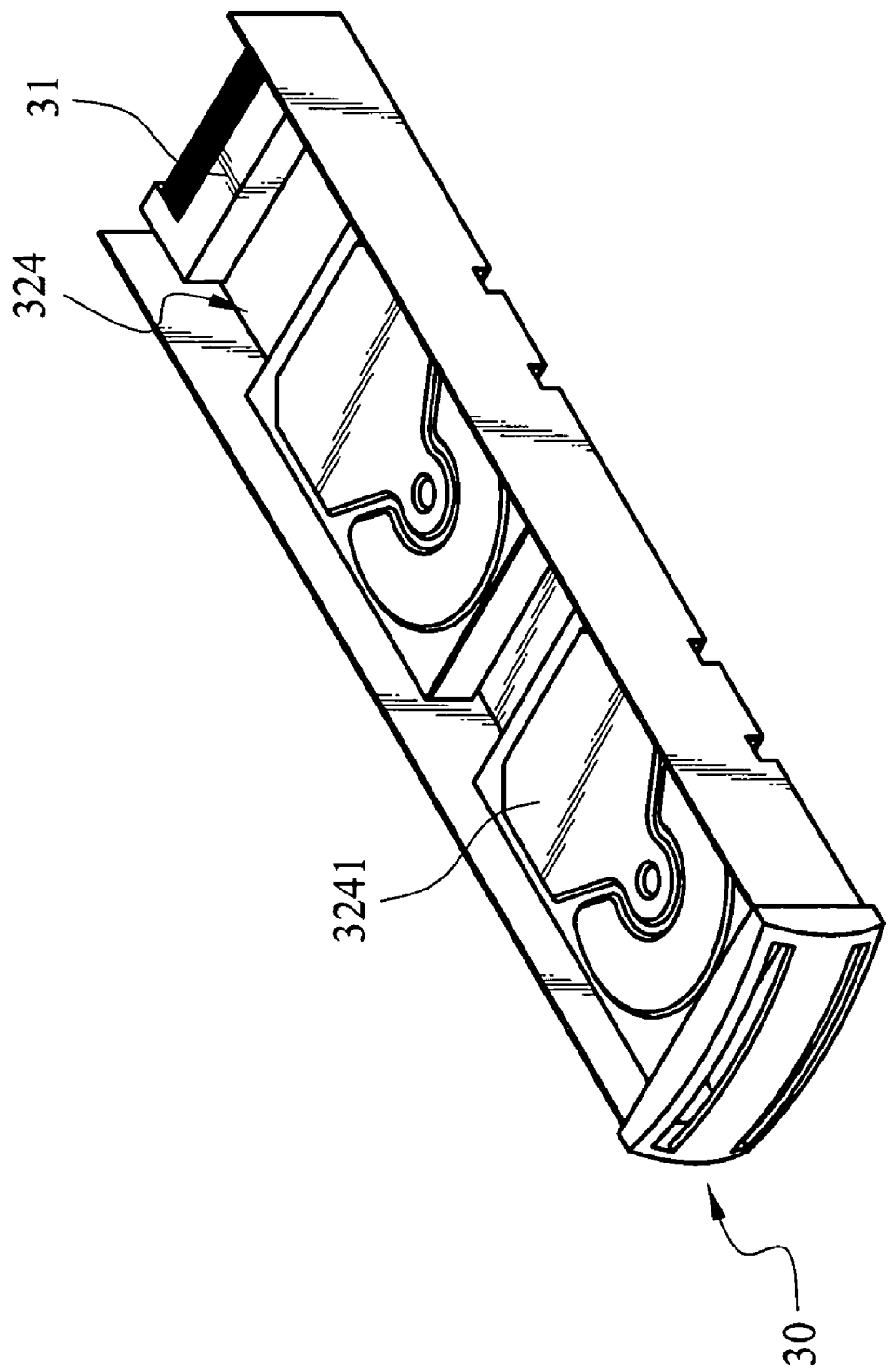
FIG. 10 shows the drawer with the forth type of the single-function module.

When the single-function module has a data storage function, the single-function module can be a hard disk drive module 324 as shown in FIGS. 6, and 10. The hard disk drive module 324 has a hard disk drive 3241 (two as shown in FIG. 10), and a voltage regulation module 3242. The hard disk drive 3241 is used for data storage. The voltage regulation module 3242 is used for regulating the power from the interface module 20 to the voltage value that the hard disk drive 3241 needs. As the connector 31 is electrically connected to the output connectors 212, the electric power distributor 22 detects that the single-function module is a hard disk drive module 324 so that the hard disk drive module controller 26 controls the motion of the removable media module 322. The electric power distributor 22 also distributes the power that the hard disk drive module 324 needs, by the power distribution board (PDB) 221 and the voltage regulation device (VRD) 222.

Referring to FIGS. 4, and 6, the power supply drawer 40 has a connector 41, and a power supply module 42. The connector 41 is electrically connected to the input connector 211. The power supply module 42 supplies the power and regulates the power. The power supply module 42 has a power supply unit 421 and a voltage regulation module 422. The power supply unit 421 is used for supplying the power to the interface module 20, and then the interface module 20 supplies the power to the functional drawer 30 through the power distribution board (PDB) 221 and the voltage regulation device (VRD) 222 of the electric power distributor 22. The voltage regulation module 422 is used for regulating the power to the voltage value that the interface module 20 needs.

Thus, the power supply unit 421 supplies the power, through the voltage regulation module. 422 which regulates the power to a voltage value, to the electric power distributor 22 by the connector 41. The electric power distributor 22 distributes the power to each of the functional drawer 30 by the connector 31, by the power distribution board (PDB) 221 and the voltage regulation device (VRD) 222. The voltage regulation module 3214 regulates the power to the voltage value that the central processing unit 3211 needs. The voltage regulation module 3222 regulates the power to the voltage value that the removable media module device 3221 needs. The voltage regulation module 3232 regulates the power to the voltage value that the peripheral component interconnect interface card 3231 needs. The voltage regulation module 3242 regulates the power to the voltage value that the hard disk drive 3241 needs. The heat produced in operation is dissipated in different places, such as the power supply drawer 40, the interface module 20, and the functional drawer 30, in case 10 and not concentrating in a place near the central processing unit as the prior art. Also, users can install the single-function modules required through the invention to fully satisfy their apparatus demands respectively. And, the type of the interface element corresponds to the functional drawer 30 that the users required.

Also, as shown in FIG. 4, the each interface module 20 is connected to the four functional drawers 30 to transmit analog signals and digital signals from the functional drawers 30, which the interface module 20 connects. Otherwise, because the number of the interface modules is four, the analog signals and digital signals are transmitted not only between the interface module 20 and the functional drawer 30, but also between the different interface modules 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A modular computer system, comprising:
   a power supply drawer having a power supply module for supplying and regulating a power;
   an interface module connected to the power supply drawer and having an electric power distributor for distributing the power from the power supply drawer;
   a plurality of functional drawers, each of the plurality of functional drawers electrically connected to the interface module to provide at least a specific function, the plurality of functional drawers including a functional drawer having a central processing unit module with data processing and data storage functions, and having a voltage regulation module for regulating the power from the interface module, wherein the central processing unit module has a central processing unit for data processing and is supplied with the power having a voltage value regulated by the voltage regulation module, a memory for data storage, and a central processing unit controller communicating with the central processing unit, the memory, and the voltage regulation module; and
   a case having one side anchored with the interface module, and comprising a plurality of first partitions for accommodating the functional drawers therein and a second partition for accommodating the power supply drawer therein.

2. The modular computer system of claim 1, wherein the interface module has an input/output external connector unit for electrically connecting the power supply drawer and the functional drawers.

3. The modular computer system of claim 2, wherein the input/output external connector unit has an input connector and the power supply drawer has a connector corresponding to the input connector.

4. The modular computer system of claim 2, wherein the input/output external connector unit has a plurality of output connectors and the functional drawers each has a connector corresponding to one of the output connectors.

5. The modular computer system of claim 1, wherein the interface module has a removable media module controller, and the plurality of functional drawers includes a functional drawer that has a removable media module with a media playing function.

6. The modular computer system of claim 5, wherein the removable media module has a removable media module device for playing, media files and being supplied with the power having a voltage value regulated by the voltage regulation module.

7. The modular computer system of claim 1, wherein the interface module has a peripheral component interconnect interface card module controller and a peripheral component interconnect interface card module bridge for connecting the interface module and the functional drawer, and at least one of the plurality of functional drawers has a peripheral component interconnect interface card module with a connecting function and controlled by the peripheral component interconnect interface card module controller.

8. The modular computer system of claim 7, wherein the peripheral component interconnect interface card module has a peripheral component interconnect interface card for connecting and being supplied with a power having a voltage value regulated by the voltage regulation module.

9. The modular computer system of claim 1, wherein the interface module has a hard disk drive module controller, and the plurality of functional drawers includes a functional drawer that has a hard disk drive module with a data storage function and controlled by the hard disk drive module controller.

10. The modular computer system of claim 9, wherein the hard disk drive module has a hard disk drive for data storage.

11. The modular computer system of claim 1, wherein the electric power distributor has a power distribution board and a voltage regulation device connected to the power distribution board.

12. The modular computer system of claim 1, wherein the interface module is connected to the functional drawers to transmit analog signals and digital signals from the functional drawers.

13. The modular computer system of claim 1, wherein the number of the interface modules is a plurality, and each of the interface modules is connected to the functional drawers to transmit analog signals and digital signals from the functional drawers, and from the other interface modules.

14. A modular computer system, comprising:
- a power supply drawer having a power supply module for supplying and regulating a power;
- an interface module connected to the power supply drawer and having an electric power distributor for distributing the power from the power supply drawer;
- a plurality of functional drawers, each of the functional drawers electrically connected to the interface module to provide at least a specific function; and
- a case having one side anchored with the interface module, and comprising a plurality of first partitions for accommodating the functional drawers therein and a second partition for accommodating the power supply drawer therein;
- wherein the interface module has a peripheral component interconnect interface card module controller and a peripheral component interconnect interface card module bridge for connecting the interface module and the functional drawer, and the functional drawer has a peripheral component interconnect interface card module with a connecting function and controlled by the peripheral component interconnect interface card module controller, and the functional drawer has a voltage regulation module for regulating the power from the interface module.

* * * * *